US012678265B2

(12) United States Patent
Paatz

(10) Patent No.: US 12,678,265 B2
(45) Date of Patent: Jul. 14, 2026

(54) CERAMIC DENTAL IMPLANT

(71) Applicant: INSTITUT STRAUMANN AG, Basel (CH)

(72) Inventor: Christian Paatz, Basel (CH)

(73) Assignee: INSTITUT STRAUMANN AG, Basel (CH)

( * ) Notice: Subject to any disclaimer, the term of this patent is extended or adjusted under 35 U.S.C. 154(b) by 378 days.

(21) Appl. No.: 18/267,571

(22) PCT Filed: Nov. 22, 2021

(86) PCT No.: PCT/EP2021/082427
§ 371 (c)(1),
(2) Date: Jun. 15, 2023

(87) PCT Pub. No.: WO2022/128343
PCT Pub. Date: Jun. 23, 2022

(65) Prior Publication Data
US 2024/0058104 A1     Feb. 22, 2024

(30) Foreign Application Priority Data
Dec. 17, 2020    (EP) ..................................... 20215201

(51) Int. Cl.
*A61C 8/00* (2006.01)
*A61C 13/20* (2006.01)
(52) U.S. Cl.
CPC .......... *A61C 8/0012* (2013.01); *A61C 13/206* (2013.01)
(58) Field of Classification Search
CPC ..................................................... A61C 8/0068
See application file for complete search history.

(56) References Cited

U.S. PATENT DOCUMENTS 5,022,860 A * 6/1991 Lazzara ............... A61C 8/0054
                                                       433/174
6,280,193 B1   8/2001 Peltier
(Continued)

FOREIGN PATENT DOCUMENTS

| CN | 201192385 Y | 2/2009 |
| EP | 2 735 279 A1 | 5/2014 |
| KR | 200381367 Y1 | 4/2005 |

OTHER PUBLICATIONS

Feb. 4, 2022 Search Report issued in International Patent Application No. PCT/EP2021/082427.
(Continued)

*Primary Examiner* — Heidi M Eide
(74) *Attorney, Agent, or Firm* — Oliff PLC

(57) ABSTRACT

A ceramic dental implant for implantation into a jaw bone extending from an apical end to a coronal end. The implant has a blind bore open towards the coronal end and extends towards the apical end along a central longitudinal axis. The blind bore includes a threaded section having a base surface where a thread protrudes radially inwards. The threaded section includes a main portion, wherein the maximum thread radius remains constant along the portion length and, adjacent to the main portion, a tapered portion where the base surface tapers radially inwards from the maximum thread radius to the minimum thread radius at the apical end of the tapered portion, the tapered portion extending over an axial length greater than the thread pitch, forming a tapered thread having gradual reduction in thread depth, the tapered thread extending over more than one thread turn.

15 Claims, 5 Drawing Sheets

(56) References Cited

U.S. PATENT DOCUMENTS

| 2005/0287497 A1* | 12/2005 | Carter | A61C 8/005 |
| | | | 433/173 |
| 2012/0301849 A1* | 11/2012 | Wang | A61C 8/0069 |
| | | | 264/16 |

OTHER PUBLICATIONS

Feb. 4, 2022 Written Opinion of the International Searching Authority issued in International Patent Application No. PCT/EP2021/082427.

* cited by examiner

CERAMIC DENTAL IMPLANT

The present invention relates to dental implants made of ceramic material and having an internal threaded bore.

Dental implants are used to replace one or more teeth in the mouth of a patient. They typically comprise an anchoring part, which is inserted into the jaw bone of the patient, and an abutment part, which extends through the gum and into the oral cavity of the patient, where it provides a core support for the final prosthesis (e.g. crown, bridge, full denture).

The anchoring part and abutment part can be provided as a single, unitary piece but are more commonly provided as separate components, to be connected together via screwing, bonding, compression fit etc. Such implant systems are commonly referred to as "two-part" or "two-piece" implants, with the anchoring part commonly being referred to in isolation as "implant" or "fixture" and the abutment part as the "abutment" or "post".

The anchoring part of a two-piece implant is usually either embedded completely in the bone, that is to say to the height of the alveolar crest, or protrudes by a few millimetres from the alveolar crest into the soft tissue. Anchoring parts intended for complete insertion into the bone are commonly referred to as "bone level" implants, while those which are intended to extend into the soft tissue are commonly referred to as "tissue level" implants. The abutment can be mounted either directly or indirectly to the anchoring part via one of a variety of known means. Most usually the abutment is either adhesively bonded or threadedly secured to the anchoring part. In the latter case, it is common for the anchoring part to comprise a longitudinally extending blind bore with an internal screw thread. The abutment, or another component, can then be fastened to the anchoring part by way of a screw which fastens to the internal threads of the anchoring part.

One-piece dental implants, in which the anchoring and abutment parts are integrally formed, may also comprise an internally threaded blind bore, in order to enable threaded attachment of other components of the dental system (e.g. prosthesis, healing caps etc.) to the implant.

The present invention can be applied to both one- and two-piece implant systems. Therefore, for the remainder of this specification, references to an "implant" refer to the component of the system which is intended for at least partial insertion into and osseointegration with the bone, regardless of whether this includes an integral abutment or not.

The majority of dental implants in use today are made of titanium or its alloys. Such materials have the necessary strength to withstand the chewing forces that the implant will be subjected to over its lifetime as well as being sufficiently biocompatible for osseointegration.

From an aesthetic point of view however, titanium implants have the disadvantage that they are dark in colour and therefore mismatch with the natural tooth colour.

Over the lifetime of an implant, the gingiva and also the jaw bone often recede. As a result of this, the dental implant can become visible and, on account of its dark colouring, also visually perceptible.

In contrast, the colour of ceramic materials more closely matches the natural tooth colour. In addition, there is a growing consumer desire to reduce or eliminate the use of metal within implants placed in the body. Efforts have thus been made to provide dental implants formed from ceramic materials such as zirconia and alumina.

In comparison to metal however, ceramic is a more brittle material and more susceptible to fracturing. There is therefore the risk of parts of the implant system becoming damaged when, e.g., anti-rotation elements and screw threads are milled into ceramic material in the course of production. In addition, during use, material fractures can arise in regions where load peaks occur, for instance in contact areas between the abutment, or other component, and the implant.

In particular, the fixation of an abutment or other component to the implant with a screw can lead to concentrations of stress at the internal screw thread of the implant, and can result in crack formation.

In order to take account of the different material properties of ceramic compared to metal, preferred designs of ceramic implant systems can differ from those of metal systems.

U.S. Pat. No. 6,280,193 B1 describes a ceramic dental implant formed by injection moulding and comprising an internal thread. The internal thread has rounded summits and hollows to ensure a higher stability of the threading.

EP 2 735 279 A1 shows a ceramic dental implant with a long blind bore, wherein the screw thread is located in the lower half of the bore. The increased length of the blind bore is said to better distribute stress over the implant body.

In light of the above mentioned problems specific to implants formed of ceramic, the object to be achieved by at least a preferred embodiment of the present invention is to provide a ceramic implant having an internal screw thread which is less susceptible to fracturing.

This object is achieved by at least preferred embodiments of the present invention, which is described in claim 1. Preferred embodiments are the subject of the dependent claims.

According to a first aspect the present invention provides a ceramic dental implant for implantation into a jaw bone, the implant extending from an apical end to a coronal end. The implant has a blind bore, which is open towards the coronal end of the implant and extends towards the apical end along a central longitudinal axis. The blind bore comprises a threaded section having a base surface from which a thread protrudes radially inwards, the base surface defining the maximum radius of the thread as measured from the central longitudinal axis, the thread having a coronal flank and an apical flank connected by a crest at their radially inner ends, the crest defining the minimum radius of the thread as measured from the central longitudinal axis, the thread extending in a helical manner along the axial length of the threaded section and having a depth defined by the difference in radius between the base surface and the crest. The threaded section comprises a main portion, within which the maximum radius of the thread remains constant along the length of the portion and, apically adjacent to the main portion, a tapered portion within which the base surface tapers radially inwards in the apical direction from the maximum radius of the thread in the main portion to the minimum radius of the thread at the apical end of the tapered portion, the tapered portion extending over an axial length greater than the thread pitch, so as to form a tapered thread having a gradual reduction in thread depth, said tapered thread extending over more than one thread turn.

In accordance with conventional dental terminology, "apical" refers to the direction towards the bone and "coronal" to the direction towards the teeth. Therefore, the apical end of a component is the end which, in use, is directed towards or into the jaw bone and the coronal end is that which is directed towards or into the oral cavity.

The terms "coronal flank" and "apical flank" as used throughout this specification refer to the faces of the thread which extend from the base surface towards the central longitudinal axis of the blind bore. The apical flank is defined as the flank facing the apical end of the implant, in other words the coronal end of the flank is found at the crest and the apical end of the flank is located at the base surface. Opposed thereto, the coronal flank is defined as the flank facing the coronal end of the implant, in other words the coronal end of the flank is located at the base surface and the apical end of the flank is found at the crest.

The term "pitch" as used throughout this specification refers to the axial distance between two adjacent thread crests, in other words the axial length of one complete thread turn.

According to the present invention, the threaded section comprises a tapered portion within which the base surface tapers radially inwards in the apical direction. The maximum radius of the thread in the tapered portion therefore decreases in the apical direction; from the maximum radius of the thread in the main portion, i.e. the radius of the base surface within the main portion, to the minimum radius of the thread at the apical end of the tapered portion. As a result, at the apical end of the tapered portion the thread disappears, as the maximum and minimum thread radii are equal to one another. All thread radii are measured from the central longitudinal axis of the bore. According to the invention the axial length of the tapered portion is greater than the pitch of the thread. In this way, the thread depth (i.e. the distance between the base surface and crest) is gradually reduced over more than one thread turn, leading to a gentle, tapered run out of the thread.

This differs from prior art implants, in which any threaded section of a blind bore usually ends abruptly in a smooth conical section having a wide cone angle. The surface of this conical section typically intersects the flank of the thread in a manner which causes a sharp angle and a thread runout of less than one turn, usually around half a thread turn. This sharp angle, when created in a ceramic implant, can lead to cracks and fracturing of the implant.

It has been found that, by providing the threaded section of the blind bore with a tapered portion at its apical end, such sharp angles can be avoided. This removes a stress point from the system and reduces the risk of crack formation within the implant.

According to the present invention the maximum radius of the thread is defined by the base surface of the threaded section. The minimum radius of the thread is defined by the radially innermost point of the crest, the depth of the thread at any axial location being given by the difference between the radius of the base surface and crest at that location.

In preferred embodiments the minimum radius of the thread is constant, at least along the full longitudinal length of the main portion of the threaded section. In such embodiments therefore, within the main portion, the thread depth as well as the maximum radius of the thread remains constant. This eases production of the bore and provides for a uniform force distribution during use.

Within the tapered portion the minimum radius of the thread may, in some embodiments, gradually increase in the apical direction, such that the reduction in thread depth within the tapered portion is caused by a tapering of both the maximum and minimum radii of the thread. However, it is preferable that the minimum radius of the thread is constant along the full length of the tapered portion. This eases production of the tapered portion. According to this preferred embodiment therefore, the gradual reduction in thread depth within the tapered portion is caused solely by the taper of the base surface. In a particularly preferred embodiment the minimum radius of the thread remains constant over the full length of the threaded section.

In embodiments in which the maximum and minimum radius of the thread, and thus also the thread depth, remain constant along the length of the main portion it is further preferable that the thread profile remains constant along the length of the main portion. By "thread profile" it is meant the longitudinal cross-section of the thread, i.e. the cross-section in a two-dimensional plane containing multiple points of the central longitudinal axis of the bore. A uniform profile is easier to manufacture and provides a consistent force interaction with the screw.

Within the tapered portion however the thread profile necessarily changes as a result of the required reduction in thread depth. It is possible, using at least some manufacturing methods, e.g. 3D printing, to maintain the cross-sectional shape of the thread profile while reducing its dimensions along the length of the tapered portion. For example, the thread profile in the tapered portion can have a triangular shape but with the dimensions of the triangle decreasing in the apical direction.

However, for design simplicity it is preferable to alter the thread profile within the tapered portion by progressively removing areas of an initial thread profile, e.g. the thread profile of the main portion, so as to change the cross-sectional shape of the thread profile along the length of the tapered portion. For example, within the tapered portion the thread profile could be altered by gradually removing the radially inner part of the profile along the length of the tapered portion, i.e. altering the crest shape. Returning to the triangular example above, in this embodiment the tip of the triangle (the tip being located at the crest) will gradually be removed along the length of the tapered portion. This design gives the visual impression of the thread crest being progressively "shaved off", until the thread is ground away entirely.

It is however preferable that within the tapered portion the thread profile is altered by gradually removing the radially outer part of the profile, i.e. altering the transition from the base surface to the thread flanks, this area of the thread being known as the thread root. Using the triangular example above, in this embodiment the base of the triangle (where it contacts the base surface) will gradually be removed along the length of the tapered portion. This design gives the visual impression of the thread being "submerged" beneath the tapering base surface.

It is also possible to combine these approaches such that, within the tapered portion, areas of the thread profile are gradually removed at both the radially outer and inner parts, such that the thread appears to be both shaved off from the crest and simultaneously submerged from the root. However, as the purpose of the invention is to provide a gradual reduction in thread depth, and for reasons of design simplicity, it is usually preferable to progressively remove only either the inner or the outer part of the thread profile within the tapered portion. In this way either the thread root remains constant while the crest shape changes or the thread crest remains constant while the shape of the thread root changes.

All of the above design possibilities for changing the thread profile can be used in embodiments in which the minimum radius of the thread in the tapered portion remains constant or increases in the apical direction.

As previously discussed, in preferred embodiments the minimum radius of the thread remains constant within the tapered portion. In one particularly preferred embodiment, within the tapered portion the thread profile remains constant relative to the base surface of the main portion, such that within the tapered portion the thread is gradually submerged by the tapering base surface. This embodiment is an example of gradually removing the radially outer part of the thread profile in order to achieve a tapered thread.

In particularly preferred embodiments the thread profile remains constant along the length of the main portion, this profile being progressively removed in the tapered portion according to one of the design concepts discussed above.

According to the present invention, the tapered thread formed within the tapered portion extends over at least one thread turn. In other words, the gradual reduction in thread depth occurs over a section of the thread extending over more than 360° about the central longitudinal axis. This is achieved by providing the tapered portion with an axial length greater than the pitch of the thread. Preferably the tapered thread extends over at least two turns, more preferably between 2 and 8 turns, most preferably between 4 and 6 turns.

Preferably the thread has a pitch of 0.2 to 0.5 mm.

Preferably the tapered portion extends over at least one quarter of the axial length of the threaded section, more preferably over at least a third of the axial length of the threaded section.

As mentioned above, according to the present invention the base surface of the threaded section defines the maximum radius of the thread. In other words the base surface is the surface containing all points of the thread having the maximum radius at each point along the axial length of the threaded section. Extrapolating these points gives a virtual surface defining the shape of the base surface. In the main portion of the threaded section the maximum radius of the thread, and hence the radius of the base surface, remains constant. The shape of the base surface over the length of the main portion is thus cylindrical.

According to the present invention, within the tapered portion a tapered thread is formed, at least in part, by a tapering of the base surface radially inwards in the apical direction. The base surface within the tapered portion may taper in a curved manner, i.e. the base surface may taper over a radius such that the shape formed by the base surface is, e.g., spherical or ovoid. Preferably however, within the tapered portion the base surface tapers radially inwards at a taper angle. The shape formed by the base surface in such embodiments is therefore conical. This simplifies the design of the tapered portion. The term "taper angle" as used in the context of the present invention refers to the angle formed by the surface in question with respect to the central longitudinal axis of the bore. The smaller the taper angle of the base surface the greater the number of thread turns, for a given pitch, within the tapered portion. A smaller taper angle results in a more gradual inward taper of the base surface and hence a more gradual reduction in thread depth.

The taper angle of the base surface may not be constant along the length of the tapered portion. For example, the tapered portion may comprise a first section in which the base surface has a first taper angle and a second apical section in which the base surface has a second taper angle greater than the first taper angle. Preferably however, the taper angle of the base surface within the tapered portion is constant over the full length of the tapered portion. This is beneficial both from a manufacturing as well as force distribution standpoint.

In a particularly preferred embodiment, the taper angle of the base surface within the tapered portion is less than 20°, preferably less than 10°, most preferably approximately 8°. These angles give a sufficiently gradual taper to provide the desired gentle thread run out.

Additionally or alternatively, the taper angle of the base surface within the tapered portion is preferably less than the taper angle of the coronal flank of the thread. The taper angle of the apical and coronal flanks may be the same or different. Having a base surface taper angle less than the coronal flank taper angle is highly beneficial in ensuring that sharp angles are not created at the intersection of the flanks and base surface.

Additionally or alternatively, it is preferred that, within the tapered portion, the angle formed between the base surface and both the apical and coronal flank is obtuse, i.e. greater than 90°. These angles are therefore prevented from being sharp, which would create a stress point.

The above described preferred configurations of the tapered portion all assist, individually and/or in combination, in creating a gradual, tapered run out of the thread which prevents or reduces stress concentrations.

As mentioned earlier, according to the present invention, the threaded section comprises a thread protruding radially inwards from the base surface, the thread comprising a coronal flank and an apical flank connected by a crest at their radially inner ends.

Preferably the thread has a thread angle of 50°-70°. The term "thread angle" hereby refers to the angle enclosed by the two flanks at the crest.

Preferably, along the length of the main portion of the threaded section, there is a curved transition between the flanks of the thread and the base surface. Such curved transitions help to prevent sharp angles within the bore and reduce the possibility of stress concentration and crack formation. In a particularly preferred embodiment, when seen in longitudinal cross-section, there is a fully curved transition between adjacent apical and coronal flanks at their radially outer ends. As discussed earlier, by "longitudinal cross-section" it is meant a cross-section taken in a two-dimensional plane containing the central longitudinal axis of the blind bore, i.e. multiple points of this axis. Such fully curved transitions at the thread root alleviate the tension between the inner screw thread of the implant and the outer screw thread of a secondary part or a fixation screw. In such embodiments the base surface is tangential to the curved transition. The curved transition may be oval or elliptic but preferably when seen in longitudinal cross-section the transition has the shape of a circular arc.

The transition between the base surface and the apical and coronal flanks within the tapered portion can also be curved as described above in relation to the main portion. This is particularly the case when the thread profile remains constant at the thread root while the radially inner part of the thread is gradually removed, or when the cross-sectional shape of the thread profile remains constant while the dimensions are reduced. However, as discussed above, in preferred embodiments the thread profile within the tapered portion is altered by gradually removing the radially outer part of the thread profile. In such embodiments, within the tapered portion any curved transition between the base surface and thread flanks is preferably kept to a minimum, i.e. as required by manufacturing tolerances.

At least along the length of the main portion, the profile, i.e. the longitudinal cross-section, of the thread crest can be any known shape, e.g. flat, pointed, rounded. In order to assist with crack prevention, it is preferable that the profile of the crest is curved, meaning that there is a fully curved transition between adjacent apical and coronal flanks at their radially inner ends. The curved profile may be oval or elliptical. In a particularly preferred embodiment of the invention however the crest profile has the shape of a circular arc. As discussed above, in preferred embodiments the thread crest remains constant in the tapered portion while the radially outer part of the thread profile is gradually removed. In addition, in some embodiments the cross-sectional shape of the thread in the tapered portion remains constant while the dimensions are gradually reduced. Particularly in such embodiments, it is preferable that the longitudinal cross-section of the crest is curved, preferably having the shape of a circular arc, along the full length of the threaded section.

Such a curved crest profile is generally not possible in a thread formed by machining, however it is possible when the implant is manufactured using, for example, injection moulding or 3D printing.

Therefore, in a particularly preferred embodiment the implant is produced by injection moulding. A ceramic implant can be produced by e.g. milling, moulding or 3D printing. A milled or 3D printed implant can be constructed with undercuts in the blind bore, whereas in moulded implants this is not possible as the mould can then not be released. A skilled person in the art can accurately distinguish a moulded implant from a milled or 3D printed implant due to its geometry, mould separation lines and injection port.

The creation of an implant via injection moulding is preferred because it is cost effective for large volumes, as well as quicker to manufacture and easier to ensure conformity of the produced components. In addition, as mentioned above, injection moulding allows the creation of an internal thread with curved crests, in addition to curved roots, which is beneficial in preventing crack formation and implant failure.

The manufacturing of a ceramic implant according to the present invention may be accomplished according to a ceramic injection moulding (CIM) method by injecting powdered ceramic material into a shaped mould. The ceramic material is thereby generally provided as powdered material and it contains binder for better moulding or forming; the binder is preferably removed after forming by burning it out prior to sintering. Sintering provides the final shape and hardness. The skilled person is aware that during sintering the implant shrinks by a factor dependent on the material and manufacturing process, but typically by around 25%.

Particularly when manufactured by injection moulding, but also when using other manufacturing methods, the implant is preferably formed using a HIP (Hot Isostatic Pressing) process. This improves the strength of the implant by increasing the density of the material.

When the implant is formed via injection moulding, it is particularly preferred that the radially outer part of the thread profile is gradually removed within the tapered portion in order to create the required reduction in thread depth. This is because such a design is easier to implement in a moulded blind bore than, e.g. removing the radially inner part of the thread profile. In particular, it is preferred that within the tapered portion the thread profile remains constant relative to the base surface of the main portion, such that within the tapered portion the thread is gradually submerged by the tapering base surface.

According to the present invention the threaded section is located in a blind bore within the implant. Preferably the apical end of the bore is rounded, in order to prevent sharp edges and stress points in the bore. The threaded section may extend over the full length of the blind bore. In preferred embodiments however, it only extends over a part of the blind bore, as a result of which the production expenditure and complexity is reduced. In certain embodiments, the threaded section lies exclusively in the lower, i.e. apical, half of the blind bore. As a result, the length of the connecting screw can be increased, which increases the possible preload force of the screw.

According to the present invention, the blind bore extends along a central longitudinal axis. While the central longitudinal axis of the blind bore can be offset from the central longitudinal axis of the implant, it is preferable that the blind bore is coaxial with at least a part of the implant. For example, some implants are angled such that they comprise a coronal part extending along a first central longitudinal axis and an apical part extending along a second central longitudinal axis, the first and second axes being angled relative to one another. In such cases the blind bore is preferably co-axial with either the coronal or apical part of the implant. When coaxial with the apical part of an angled implant the blind bore opening will not be located at the coronal end surface of the implant but is open towards the coronal end of the implant such that the bore is accessible from the coronal end of the implant.

Most implants however extend from their apical to coronal end along a single central longitudinal axis. In such cases the blind bore is not only open towards the coronal end of the implant, but its opening is located at the coronal end surface of the implant. Preferably the blind bore is coaxial with the central longitudinal axis of the implant. In other words, preferably the implant extends from an apical end to a coronal end along a central longitudinal axis, the blind bore being open at the coronal end surface of the implant and extending towards the apical end along said central longitudinal axis. In such cases the central longitudinal axis of the bore is identical to the central longitudinal axis of the implant.

In such preferred embodiments the length of the blind bore, as measured in the longitudinal direction, is preferably more than 70% of the axial length of the implant, more preferably more than 75% and most preferably at least 80%. This is longer than the bores found in standard titanium implants. The longer the length of the blind bore relative to the length of the implant, the more balanced the mass distribution of the implant. In standard implants the apical end of the implant below the blind bore is typically solid, resulting in a greater mass. When a screw is tensioned within the bore this apical mass creates more strain within the implant. A longer bore reduces the mass at the apical end of the implant and consequently reduces the strain during use. This is particularly beneficial in ceramic implants, given the brittle nature of this material. In addition, reducing the ceramic volume of the implant reduces the possibility for defects within the ceramic material, particularly in relation to 3D printing and injection moulding methods.

These advantages are also present in angled implants in which the bore is located in the apical part of the implant. In such embodiments therefore it is preferred that the length of the blind bore, as measured in the longitudinal direction, is preferably more than 70% of the axial length of the apical part of the implant, more preferably more than 75% and most preferably at least 80%.

As discussed above, it is preferable that the threaded section does not extend over the full length of the blind bore. Further, it is preferable that the threaded section does not extend to the apical end of the bore. Therefore, it is preferred that the blind bore further comprises, apical of the threaded section, a non-threaded end section extending from the apical end of the threaded section to the apical end of the bore. This is particularly advantageous in embodiments in which a longer bore length is used, i.e. the blind bore has a length of at least 70% of the length of the implant (or apical part of an angled implant). Such a non-threaded end section lengthens the bore while maintaining the simplicity of the design and allowing the same screw length to be used with all implant lengths.

As the position of the threaded section within the bore will determine the length of screw which can be used with the implant, the position of this threaded section will typically remain constant, relative to the coronal end of the blind bore, in different lengths of implant. This enables a standard screw length to be used with all implant lengths. Between implants of different lengths therefore, the length of the non-threaded end section will typically vary in order to extend the bore over the desired length of the implant.

Preferably the non-threaded end section has an axial length of at least one third the length of the tapered portion, more preferably a length of between one third and three times the length of the tapered portion.

The non-threaded end section may be cylindrical, curved or conical, or a combination of these shapes. In some embodiments the shape of the non-threaded end section matches that of the outer surface of the implant at the axial location of the non-threaded end section, such that the implant has an essentially constant wall thickness over the length of the non-threaded end section. Therefore, when the outer surface of the implant tapers at its apical end, it is preferable that the non-threaded end section of the bore is similarly tapered. Alternatively, when the implant is a parallel walled (cylindrical) implant, it is preferable that the non-threaded end section is cylindrical.

When the implant is manufactured by injection moulding, a more or less constant wall thickness improves the flow of feedstock during injection moulding. Thus, in such embodiments it can be particularly preferred that any non-threaded end section of the blind bore matches the shape of the outer surface of the implant at the axial location of the non-threaded end section, as discussed above. However, often a compromise is needed in order to ensure that the apical end of the blind bore does not become too narrow. If the mould pin used to form the bore is too thin, this can vibrate during the injection moulding process. Therefore, in certain preferred embodiments the non-threaded end section has a taper angle (with respect to the central longitudinal axis of the bore) that is equal to or smaller than the taper angle, where present, of the tapered portion of the threaded section. This assists in providing an optimum length and diameter of bore. Additionally or alternatively, and regardless of whether the tapered portion comprises a taper angle, in preferred embodiments the non-threaded end section has a taper angle of less than 1°, more preferably around 0.5°. This small taper angle prevents the apical end of the bore from becoming too thin, even in long bore lengths, while also assisting with demoulding. The provision of a small taper angle to assist with demoulding is beneficial in parallel walled as well as apically tapered implants.

In preferred embodiments the dental implant further comprises an anti-rotation element coronal of the threaded section. The anti-rotation element has a non-circular symmetric cross-section in a plane perpendicular to the central longitudinal axis of the blind bore. This anti-rotation element can be formed within the blind bore, or on an external surface of the implant. The anti-rotation element of the implant can be any known shape, e.g. oval, polygonal, torx, a series of alternating protrusions and recesses etc. Preferably the blind bore comprises an anti-rotation element coronal of the threaded section.

When a cooperating secondary component, such as an abutment, crown, etc., having a complementary shaped anti-rotation element is connected to the implant, axial alignment of the two anti-rotation elements prevents relative rotation of the secondary component and the implant about the central longitudinal axis of the bore. When present, the anti-rotation element of the implant can also serve as a torque transmission means for a suitable insertion tool in order to anchor the implant in the jaw bone. To this end, in a known manner, a correspondingly formed free end of an insertion tool can be brought into releasable engagement with the implant anti-rotation element in order to transmit a torsional moment to the dental implant.

The blind bore of the implant is intended to allow connection of a secondary component (e.g. abutment, healing cap etc.) to the implant via a screw connection with the threaded section. For fixedly connecting the secondary component to the implant, the secondary component may comprise an outer screw thread that is intended to engage with the main portion of the threaded section of the blind bore of the implant. Alternatively, the secondary component may comprise a through hole, through which a fixation screw can be inserted, such that the apical end of the screw protrudes out of the apical end of the secondary component and can engage with the threaded section of the implant bore.

For instance, an abutment having a screw channel can have an apical end designed for insertion into the blind bore of the implant. A fixation screw can be inserted through the screw channel of the abutment and driven into the internal thread of the implant by means of a tool introduced from above into the screw channel of the abutment, thereby fixedly connecting the abutment and the implant. The apical end of the abutment may include an anti-rotation element on its outer surface, e.g. a portion having a polygonal cross-section, that can be brought into axial alignment with a complementary anti-rotation element, e.g. a polygonal portion, provided in the blind bore, to prevent relative rotation of the implant and the abutment.

Suitable fixation screws can be produced in a known manner from metal, preferably titanium or a titanium alloy as said materials ensure good stability, biocompatibility and sterilization. The additional advantage of metal materials is that they comprise a certain elasticity and the holding force of the fixation screw is increased as a result of the screw expanding minimally elastically along its longitudinal axis when screwed-in. The tensile force resulting from the expansion then results in a particularly sturdy connection between dental implant and secondary component. In other embodiments a ceramic or polymer screw can be used, produced by, e.g. milling. This is beneficial in meeting consumer desire for metal free dental implants.

In certain preferred embodiments the blind bore of the implant further comprises, coronal of the threaded section and, where present, the anti-rotation element, a circular symmetric non-threaded section. This non-threaded section can be tapered or non-tapered in the longitudinal direction and serves to provide a deeper and hence more stable connection between the implant and the secondary component.

Preferably the coronal circular symmetric non-threaded section is cylindrical. In other embodiments however the coronal circular symmetric non-threaded section may be conical and assist in producing a good seal, e.g. a Morse taper, between the implant and secondary component. In an alternative preferred embodiment the coronal circular symmetric non-threaded section comprises a plurality of conical and/or cylindrical segments. These can be arranged in any order. For example, the coronal circular symmetric non-threaded section may comprise a cylindrical segment followed coronally by one or more conical segments. Where a plurality of conical segments is present these may be placed sequentially or alternate with one or more cylindrical segments. The cylindrical and conical segments may have different axial lengths and the conical segments may also have different taper angles.

The outer surface of the dental implant is preferably tapered in the apical direction at least over a portion of its length, the tapering occurring within at least the apical half of the implant.

The implant preferably comprises an external screw thread for anchoring the implant within a jaw bone, which protrudes from the outer surface of the implant and extends over at least part of its length. The external thread serves for primary or immediate anchoring of the dental implant in a jaw bone. The external thread may thereby extend over the entire length of the dental implant. As an alternative to this, the external thread may extend over at least 50% of the overall length of the dental implant and preferably over at least 75% of the dental implant length, with the thread beginning at or near (e.g. within 1 mm of) the apical end. The external thread can have any known shape and may comprise one or more self-tapping groove. The thread depth of the external thread may remain constant or may vary over the length of the implant. At its coronal end the outer surface of the dental implant can comprise a thread-free portion coronal of the external thread.

To improve osseointegration, the portion of the dental implant intended for placement in the bone can have a roughened external surface according to any known technique or be surface-treated in another known manner, e.g. with a coating. By "external surface" it is meant the outer surface and, where present, the external screw thread.

According to a preferred embodiment, a plurality of implants according to the present invention are provided, the plurality of implants having different axial lengths. The position of the threaded section within the blind bore of each implant, relative to the coronal end of the blind bore, is constant. The blind bore of each implant preferably further comprises a non-threaded end section extending from the apical end of the threaded section to the apical end of the blind bore, the axial length of the non-threaded end section differing between implants, such that implants having a longer axial length have a longer non-threaded end section.

The invention further relates to a method of manufacturing the dental implant described above by injection moulding, wherein a pin is used as a negative template for the threaded section of the blind bore. This means that the outer shape of the pin comprises a thread which corresponds to the internal shape of the threaded section of the blind bore but taking into account the shrinkage factor of the ceramic after sintering. Therefore, the pin dimensions will be approximately 25% larger than the final implant dimensions.

According to another aspect therefore the present invention provides a method of manufacturing a dental implant comprising the steps of providing a mould for ceramic injection moulding, the mould comprising a pin extending along a central longitudinal axis and having a threaded section, the threaded section comprising a base surface from which a thread protrudes radially outwards, the base surface defining the minimum radius of the thread as measured from the central longitudinal axis, the thread having a coronal flank and an apical flank connected by a crest at their radially outer ends, the crest defining the maximum radius of the thread as measured from the central longitudinal axis, the thread extending in a helical manner along the axial length of the threaded section and having a depth defined by the difference in radius between the base surface and the crest, the threaded section comprising a main portion, within which the maximum radius of the thread remains constant along the length of the portion and, apically adjacent to the main portion, a tapered portion within which the maximum radius of the thread decreases in the apical direction from the maximum radius of the thread in the main portion to the minimum radius of the thread at the apical end of the tapered portion, the tapered portion extending over an axial length greater than the thread pitch so as to form a tapered thread having a gradual reduction in thread depth, said tapered thread extending over more than one thread turn, and using said mould to create a dental implant using ceramic injection moulding.

Preferably the thread of the pin comprises a curved transition between the base surface and the apical and coronal flanks at least along the length of the main portion. Preferably, when seen in longitudinal cross-section, the transition has the shape of a circular arc. Additionally or alternatively, the thread of the pin comprises, at least along the length of the main portion, crests having a curved longitudinal cross-section, preferably having the shape of a circular arc.

Further preferred features of the threaded section of the pin are complementary to the preferred features of the threaded section of the implant. For example, it is preferred that the thread profile within the tapered portion of the pin is altered by gradually removing the radially outer part of the profile. Additionally or alternatively it is preferred that the minimum radius of the thread remains constant along the length of the threaded section.

Preferred embodiments of the present invention will now be described, by way of example only, with reference to the accompanying drawings, in which.

Figures 1A, 1B, 1C:
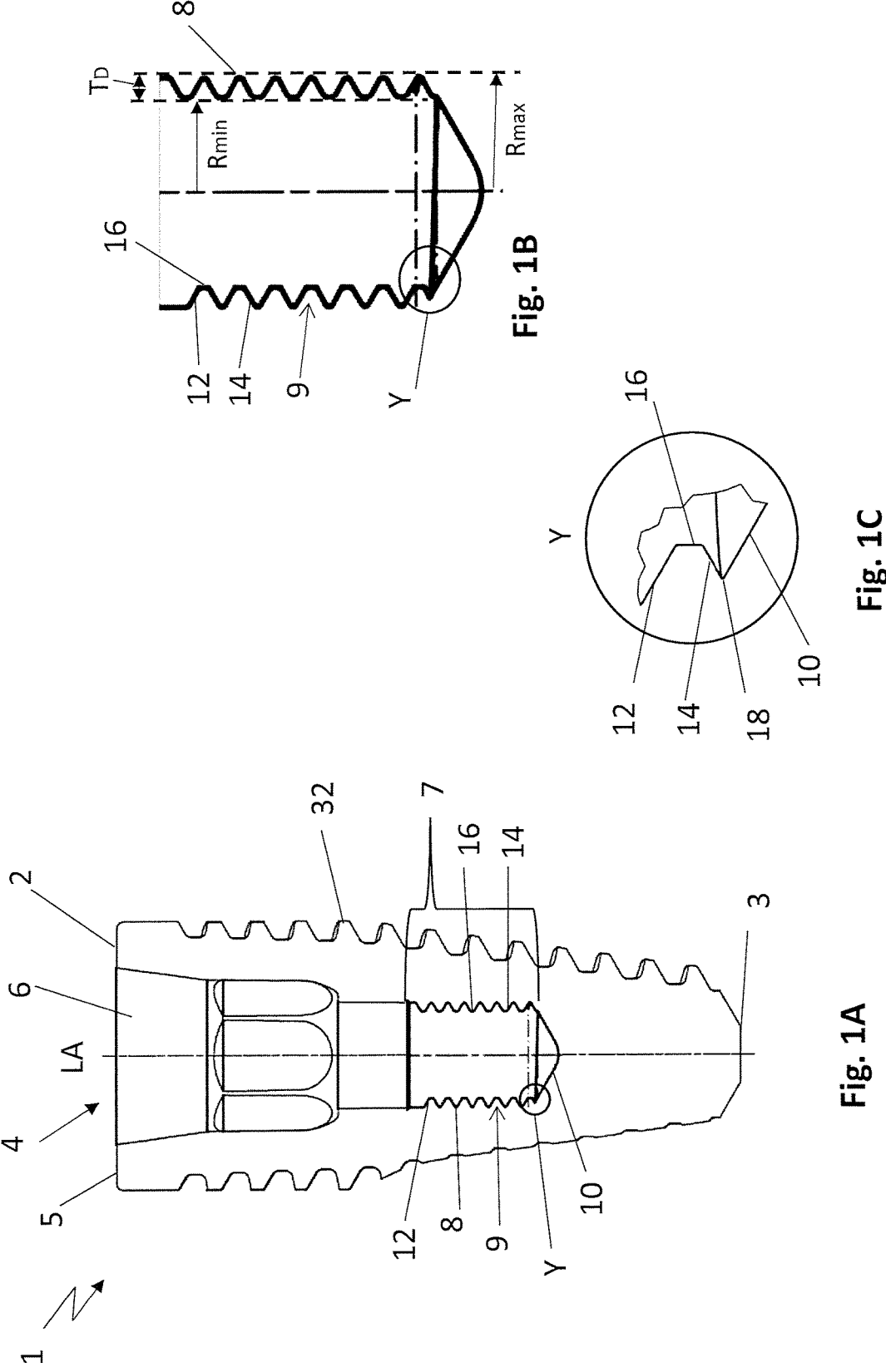
FIG. 1A shows a longitudinal cross-section of an implant as known in the art.
FIG. 1B shows an enlargement of the threaded section of FIG. 1A.
FIG. 1C shows detail Y from FIGS. 1A and 1B.

FIG. 1A shows an implant 1 representative of the prior art. Implant 1 is adapted for use with a secondary component, e.g. an abutment (not shown), and extends along a central longitudinal axis LA from an apical end 3 to a coronal end 2. The implant 1 includes a blind bore 4 which is open at the coronal end 2 and surrounded by the coronal end surface 5 of the implant 1, which radially encircles the bore opening 6. The blind bore 4 is coaxial with the implant 1 and thus also extends along the central longitudinal axis LA. The outer surface of implant 1 is provided with an external thread 32 for screwing the implant 1 into the jaw bone of a patient.

The blind bore 4 comprises a threaded section 7, located towards the apical end of the bore 4. The threaded section 7 comprises a base surface 8 from which a thread 9 protrudes radially inwards into the bore 4 (i.e. towards the central longitudinal axis LA). As also shown in detail in FIG. 1B, the thread 9 has a coronal flank 12 and an apical flank 14 connected by a crest 16 at the their radially inner ends and extends in a helical manner along the length of the threaded section 7. As shown in FIG. 1B, the base surface 8 defines the maximum radius $R_{max}$ of the thread 9 while the crest 16 defines the minimum radius $R_{min}$, the difference between the maximum and minimum radii at any given point giving the thread depth $T_D$.

At the apical end of the threaded section 7 a non-threaded conical section 10 intersects the thread 9. This is shown in detail in FIG. 1C. As can be seen in this figure, the conical surface 10 intersects apical flank 14 at a sharp angle, forming a thin, sharp edge 18 in the bore. This creates a stress concentration point. When the implant 1 is made of ceramic, such a sharp edge 18 can lead to crack formation and implant failure. As can also be seen in this figure, crest 16 has a planar shape when viewed in longitudinal cross-section. Such a crest is the simplest shape to form when milling an implant but can also lead to problematic stress concentrations in ceramic implants.

Figure 2D:
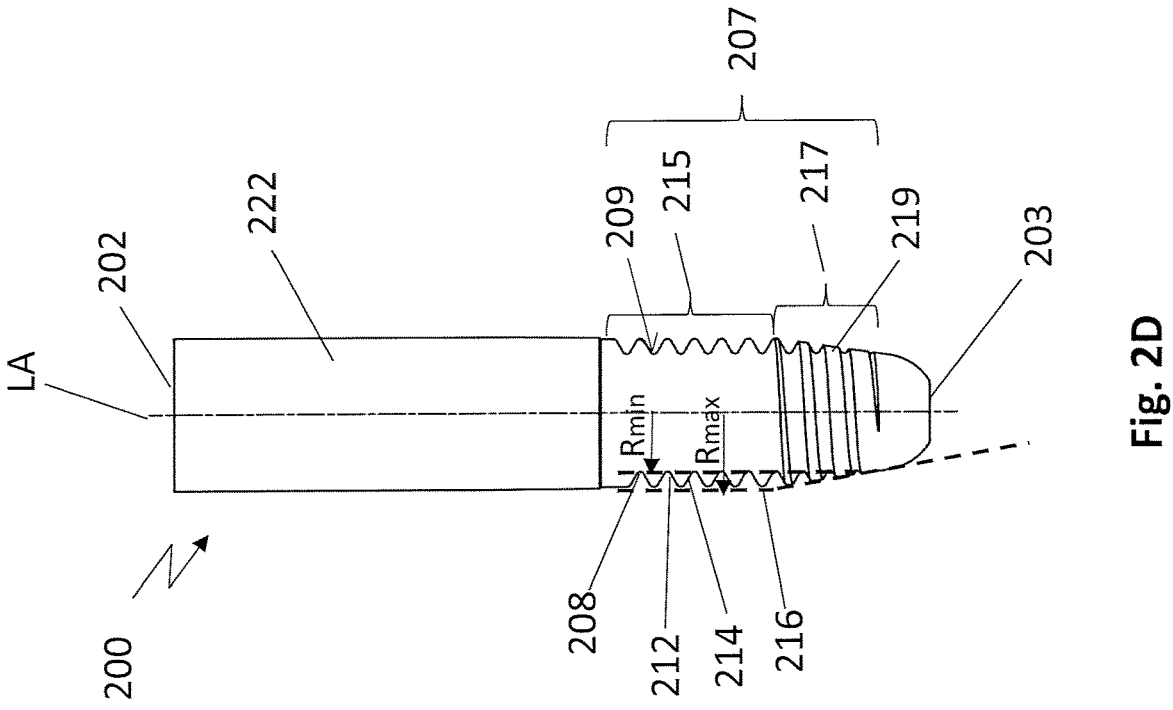
FIG. 2D shows a pin for producing the implant of FIG. 2A by an injection moulding method.
Figure 2A:
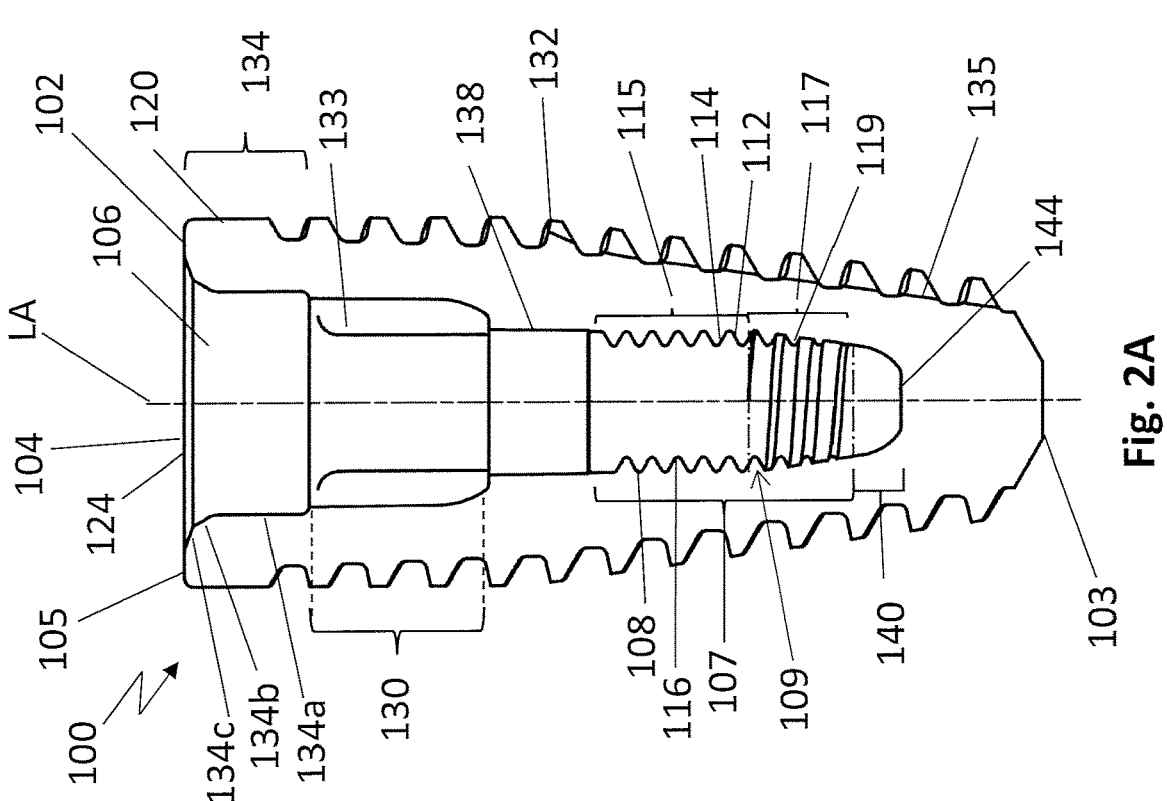
FIG. 2A shows a longitudinal cross-section of an implant according to a preferred embodiment of the present invention.

FIG. 2A shows an implant 100 in accordance with the present invention. The implant 100 is made of a ceramic material, for example an aluminium or zirconium or magnesium based ceramic material, such as aluminium oxide, zirconium oxide or magnesium oxide or combinations thereof. In addition, stabilizing agents, such as yttrium or cerium oxide may be included in the ceramic material.

Similar to the prior art implant 1 described above, the inventive implant 100 extends along a central longitudinal axis LA from an apical end 103 to a coronal end 102. The implant 100 includes a coaxial, longitudinally extending blind bore 104, which is open at the coronal end 102 and extends towards the apical end 103 along axis LA. The blind bore 104 comprises a threaded section 107, having a base surface 108 from which a thread 109 protrudes radially inwards into the bore 104. The thread 109 has a coronal flank 112 and an apical flank 114 connected by a crest 116 at their radially inner ends. The thread 109 extends in a helical manner along the length of the threaded section 107. The base surface 108 defines the maximum radius $R_{max}$ of the thread 109 while the crest 116 defines the minimum radius $R_{min}$, the difference between the maximum and minimum radii at any given point giving the thread depth $T_D$ (see FIG. 2B).

In contrast to prior art implants, the threaded section 107 of implant 100 comprises a main portion 115 and, apically adjacent to the main portion 115, a tapered portion 117. The maximum radius $R_{max}$ of the thread 109 within the main portion 115 remains constant, while within the tapered portion 117 the base surface 108 tapers radially inwards in the apical direction from the maximum radius $R_{max}$ of the thread 109 in the main portion 115 to the minimum radius $R_{min}$ of the thread 109 at the apical end of the tapered portion 117, the tapered portion 117 extending over an axial length greater than the thread pitch, so as to form a tapered thread 119 having a gradual reduction in thread depth $T_D$ extending over more than one thread turn. The radially inwards tapering of the base surface 108 is further clearly visible in FIGS. 4B-4E. The tapering base surface 108 results in the thread depth $T_D$ gradually decreasing over a number of thread turns, resulting in a gentle run-out of the thread 109. The thread 109 is therefore not cut off abruptly, and the formation of the sharp edge 18 found in the prior art (see FIG. 1C) is prevented. Hence a stress point within the bore which could lead to crack formation is eliminated.

Figure 2C:
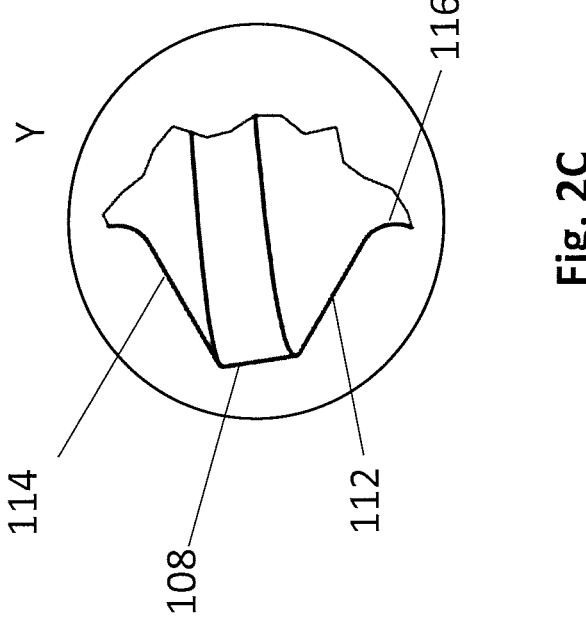
FIG. 2C shows detail Y from FIG. 2B.
Figure 2B:
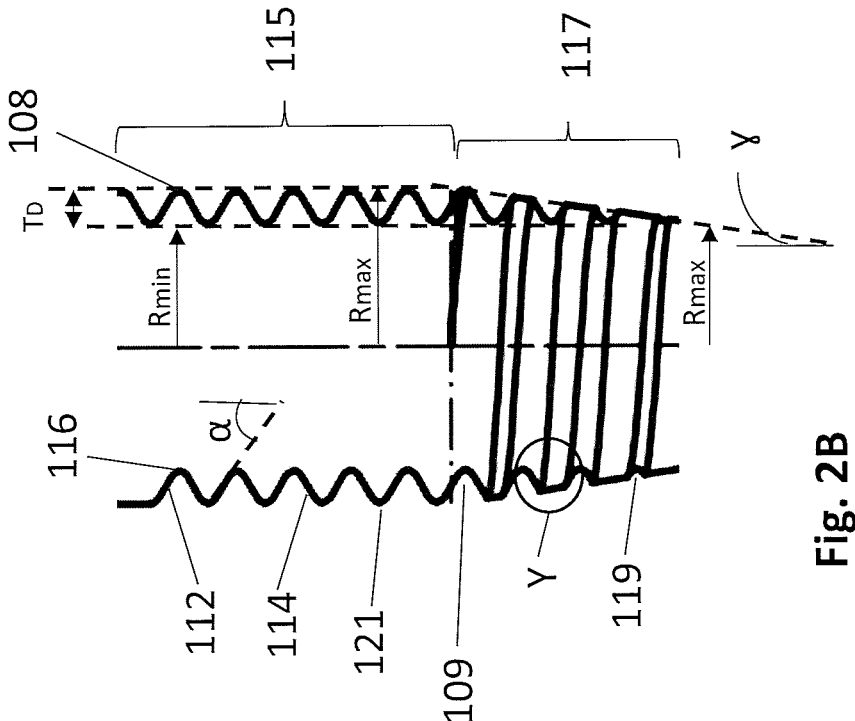
FIG. 2B shows an enlargement of the threaded section of FIG. 2A.

FIG. 2B shows an enlargement of the threaded section 107. The enlarged view shows how the tapering base surface 108 tapers radially inwards at taper angle γ, as measured from the central longitudinal axis LA, thus forming a conical shape. The taper angle γ remains constant over the length of the tapered portion 117. In the present embodiment the taper angle γ is 8°. This angle is smaller than taper angle α of the coronal flank 112, as measured from the central longitudinal axis LA. An obtuse angle is formed between the tapered base surface 108 and both the apical 114 and coronal 112 flank, as can best be seen in FIG. 2C. The taper angle γ is chosen such that the thread run out occurs over more than 3 thread turns.

Within the main portion 115 the maximum radius $R_{max}$ remains constant, resulting in a base surface 108 having a cylindrical shape. In addition the minimum radius $R_{min}$ of the thread 109 and the thread profile also remain constant, providing a uniform force distribution in use.

Within the tapered portion 117 the minimum radius $R_{min}$ remains constant, such that the reduction in thread depth is caused solely by the taper of the base surface 108. The thread profile remains constant relative to the base surface of the main portion 115. In this way the thread 109 is gradually submerged by the tapering base surface 108 from the thread root 121 towards the crest 116.

Figure 4C:
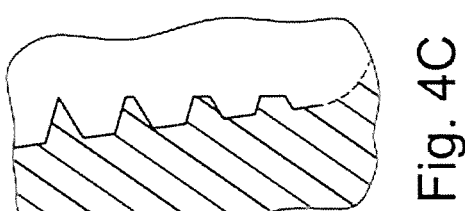
FIGS. 4A-E show schematic illustrations of alternative designs of thread profiles within the tapered portion.
Figure 4E:
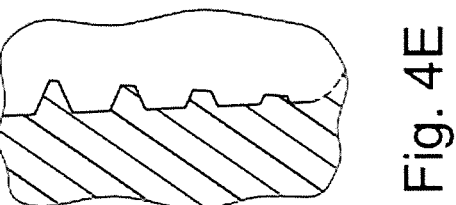
Figure 4B:
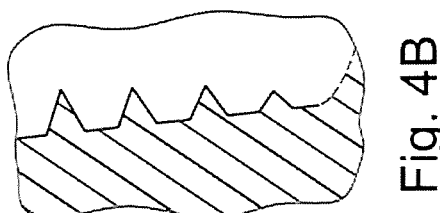
Figure 4D:
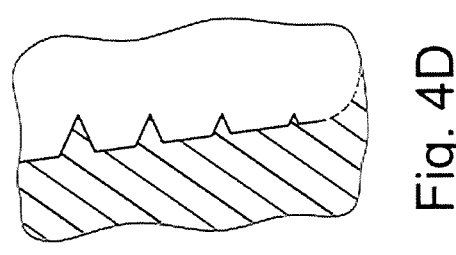
Figure 4A:
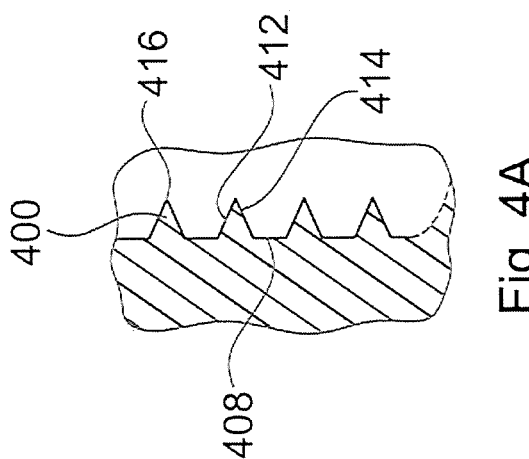

Alternative designs of tapered thread 119 are illustrated schematically with reference to FIGS. 4A-E. FIG. 4A shows a longitudinal cross-section of a thread 400 having a uniform thread profile such as could be formed in the main portion of the threaded section. The thread 400 extends from base surface 408 and has apical 414 and coronal 412 flanks connected by a crest 416. FIGS. 4B-4E show different ways in which this basic thread profile can be altered to form a tapered thread.

FIG. 4B shows how the thread depth can be reduced by maintaining the cross-sectional shape of the thread 400 while gradually reducing its dimensions. FIG. 4C shows how the thread profile of FIG. 4A can be altered by gradually removing the radially inner part of the profile. In this way the thread crest 416 changes along the length of the thread while the transition from base surface 408 to flanks 414, 412 remains constant. In FIG. 4D, the thread profile of FIG. 4A is altered by gradually removing the radially outer part of the profile. In this way the thread crest 416 remains constant while the transition from base surface 408 to thread flanks 414, 412 is altered. In both FIGS. 4C and 4D areas of the triangular thread profile are progressively removed, with this removal either occurring at the thread crest or thread root. When material is removed from the thread crest (the radially inner part of the profile) this gives the visual impression that the thread tip is being "shaved off" until the thread is ground away entirely (see FIG. 4C). When material is removed from the thread root (the radially outer part of the profile) this gives the visual impression of the thread being "submerged" beneath the base surface (see FIG. 4D). The design of tapered portion 117 is therefore an example of this form of profile alteration.

In FIGS. 4B-4D the minimum radius of the thread 400 remains constant, however it is also possible for the minimum radius to increase in the apical direction. This is shown in FIG. 4E. In FIG. 4E both the inner and outer parts of the thread profile are gradually removed such that the thread appears to be both shaved off from the crest and submerged from the root simultaneously.

Each of the thread designs shown in FIGS. 4B-4E enables the thread depth to be gradually reduced in order to provide the tapered thread of the present invention.

Returning to the implant shown in FIGS. 2A-C, the crest 116 is curved, forming a circular arc in longitudinal cross-section over the full length of the threaded section 107. In addition, within the main portion 115, the transition between the apical 114 and coronal 112 flank at the base surface 108, known as the thread root 121 (see FIG. 2B), also forms a circular arc in longitudinal cross-section. These rounded roots 121 and crests 116 between the flanks prevent stress concentrations at these narrow areas of the thread 109. While rounded roots 121 are possible at the base surface 108 of an implant formed by milling, rounded crests 116 cannot be created by traditional milling techniques. This can be seen in the implant 1 of FIG. 1, in which crest 16 is planar in longitudinal cross-section. In order to create rounded crests 116 the implant 100 must be 3D printed or injection moulded. A pin 200 suitable for use in injection moulding, and which can be used to create the threaded section 107 of implant 100, is shown in FIG. 2D.

The pin 200 of FIG. 2D is placed in a cast, whereby the latter has a hollow interior space corresponding to the external shape of the implant to be produced. The pin 200 comprises a negative template of the shape of the threaded section 107 of implant 100, meaning that it has an outer shape that corresponds to the inner shape of the threaded section 107 within the future implant 100. The dimensions of pin 200 are approximately 25% greater than the desired dimensions of the finished threaded section 107 in order to account for the shrinkage that occurs during the sintering step of ceramic implant manufacturing. When the bore 104 of the implant contains additional features, e.g. an anti-rotation element, collars corresponding to the desired additional features are placed around pin 200 to suitably modify the internal shape of the manufactured bore 104. Ceramic material is injected into the cast, around the pin 200. This produces a solid, stable green body that can be removed from the cast, and upon removal of the pin (and optional collars) from the body, an implant as shown in FIG. 2A in accordance with the present invention can be obtained through sintering.

The pin 200 includes a shank 222 which extends along a central longitudinal axis LA from an apical end 203 to a coronal end 202 and includes an outer threaded section 207. The threaded section 207 comprises a base surface 208 from which thread 209 protrudes radially outwards. In this way, in contrast to the final thread 109 of the implant, base surface 208 defines the minimum radius $R_{min}$ of thread 209. The thread 209 has a coronal flank 212 and an apical flank 214 connected at their radially outermost points by crest 216, the outermost point of the crest 216 defining the maximum radius $R_{max}$ of the thread 209. As the pin 200 is a negative template, apical flank 214 of the pin 200 provides the shape for coronal flank 112 of the implant 100 while coronal flank 212 of the pin 200 provides the shape for apical flank 114 of the implant 100. Similarly, crest 216 of pin 200 will define the base surface 108 and roots 121 of the implant 100 while the base surface 208 of pin 200 defines the crest 116 of implant 100.

The threaded section 207 of the pin 200 comprises a main portion 215 and a tapered portion 217 apically adjacent to the main portion 215. Within the main portion 215 the maximum radius $R_{max}$ of the thread 209 remains constant. Within the tapered portion 217 the maximum radius $R_{max}$ decreases in the apical direction from the maximum radius $R_{max}$ of the main portion 215 to the minimum radius $R_{min}$ of the thread 209 at the apical end of the tapered portion 217. The tapered portion 217 extends over an axial length greater than the thread pitch, such that a tapered thread 219 is formed within the tapered portion 217 that extends over more than one thread turn.

The shape of the crest 216 within the tapered portion 217 of the pin 200 mirrors the desired shape of base surface 108 of the tapered portion 117 of the implant 100 to be manufactured. Therefore, in the present embodiment, the crest 216 tapers radially inwards at a taper angle of approximately 8°, creating a conical surface.

The implant 100 shown in FIG. 2A is adapted for use with a secondary component, e.g. an abutment (not shown) or directly connecting prosthesis. Additionally, temporary secondary components can be fitted to the implant 100 prior to connection of the abutment, such as a healing cap or impression post. These components can all be connected to the implant 100 by way of threaded section 107.

The outer surface of the implant 100 is provided with an external thread 132 and a self cutting groove 135 for screwing the implant 100 into a bore hole in the jaw bone of a patient (not shown). The thread 132 begins near the apical end 103 of the implant and can extend to coronal end 102. In the present embodiment however the implant comprises an unthreaded coronal neck part 120. The coronal end surface 105 of the implant 100 is planar and transverse to the central longitudinal axis LA. The coronal end surface 105 radially encircles coronal opening 106 of the blind bore 104.

The blind bore 104 comprises, in addition to the threaded section 107, a circular symmetric non-threaded section 134 located at the coronal end of the bore 104. This coronal circular symmetric non-threaded section 134 can be cylindrical or conical or, as in the present case, comprise a plurality of conical and cylindrical segments 134a, 134b, 134c. The provision of such a coronal circular symmetric non-threaded section 134 allows the secondary component to be placed deeper in the implant 100 and hence provides a more stable connection. Any conical surface of the coronal circular symmetric non-threaded section 134, e.g. conical surface 134c, can also be used to form a seal between the implant and secondary component. Alternatively, a seal with the secondary component could be formed using coronal end surface 105.

The blind bore 104 further comprises an anti-rotation element 130. This element 130 is located coronal of threaded section 107 and apical of coronal circular symmetric non-threaded section 134. In the present embodiment the anti-rotation element 130 comprises a plurality of circumferentially spaced ribs 133 which protrude radially inwards into the bore 104. The anti-rotation element 130 therefore has a non-circular-symmetric cross-section in a plane perpendicular to the central longitudinal axis LA. When an abutment or other secondary component having a complementary anti-rotation element is inserted into the bore 104, the engagement of the ribs 133 with complementary grooves in the secondary component prevents relative rotation about the central longitudinal axis LA. Such complementary anti-rotation elements are well known in the field of dental implants and can have alternative cross-sectional shapes e.g. polygonal, oval etc.

Apically adjoining the anti-rotation element 130 inside the blind bore 104, the implant 100 comprises a cylindrical section 138 with a non-threaded surface that runs into the threaded section 107 described above. Altering the length of this cylindrical section 138 alters the depth at which the threaded section 107 begins and hence can be used to determine the length of screw necessary for use with the implant 100. Such a cylindrical section can be used, for example, to ensure that the threaded section 107 lies exclusively in the lower half of the implant 100.

Apically adjoining the threaded section 107, the implant 100 includes a non-threaded end section 140 that is tapered in the apical direction in a curved manner. The non-threaded end section 140 extends from the apical end of threaded section 107 to the apical end 144 of the blind bore 104. The non-threaded end section 140 increases the length of the bore 104 without requiring a lengthening of the threaded section 107. Increasing the length of the bore 104 reduces the mass of the apical end of the implant 100, thus reducing the strain during use.

As the position of the threaded section 107 determines the length of screw that can be used with the implant 100, the position of the threaded section 107 relative to the coronal end 102 of the implant 100 generally remains constant, despite changes in the overall length of the implant 100. This enables abutments and other secondary components to be sold with a standard screw length that can be used with a range of implants independent of the length of these implants. As the position and length of the threaded section 107 typically remains constant, the length of the non-threaded end section 140 can be increased in implants of greater length in order to reduce the mass of the apical part of the implant.

Figure 3:
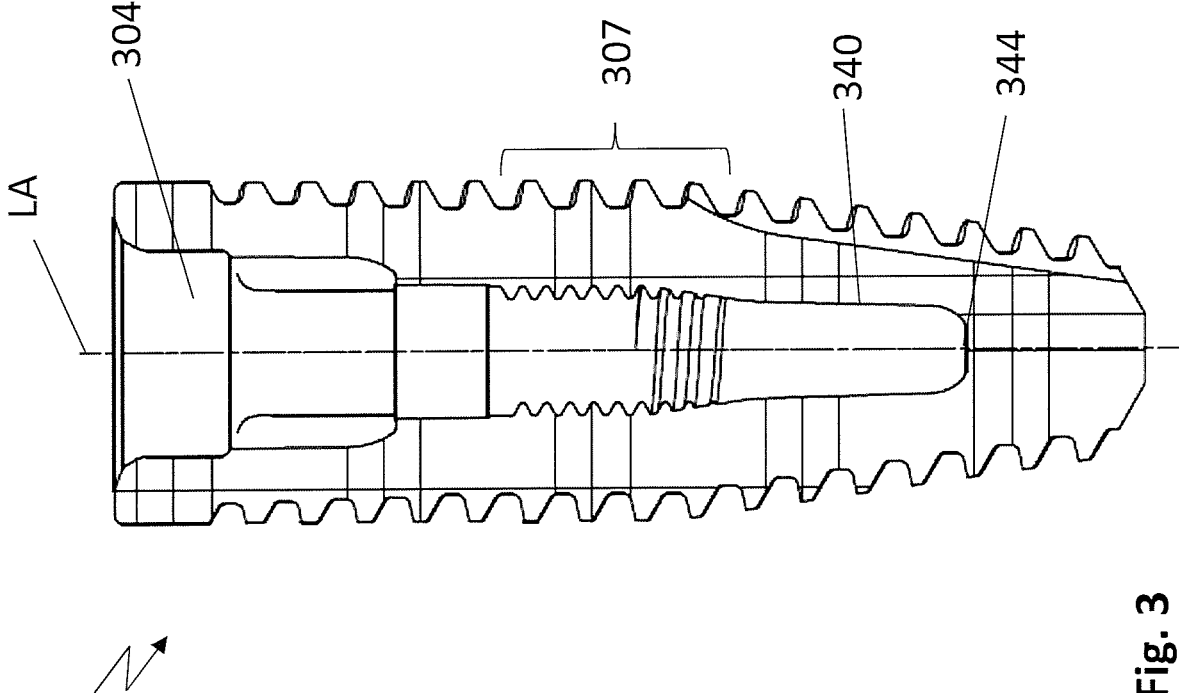
FIG. 3 shows an alternative preferred embodiment of an implant in accordance with the present invention.

An example of this is shown in FIG. 3. The implant 300 shown in FIG. 3 essentially corresponds to the implant 100 of FIG. 2A. In particular, threaded section 307 and all parts of the bore 304 coronal of the threaded section 307 are identical to FIG. 2A. Only the apical part of the blind bore 304 is different in that the non-threaded end section 340 which apically adjoins the threaded section 307 is much longer than the equivalent non-threaded end section 140 of the implant 100 shown in FIG. 2A. This is because the implant 300 has a greater axial length than the implant 100 and hence the longer non-threaded end section 340 prevents a large mass at the apical end of the implant 300. The non-threaded end section 340 is slightly conical, e.g. with a taper angle of 0.5°, in order to assist with demoulding. The taper angle of the non-threaded end section 340 is smaller than the taper angle of the tapered portion of the threaded section 307. At its apical end the non-threaded end section 340 tapers in the apical direction in a curved manner towards the apical end 344 of the blind bore 304. This rounding of the apical end of the bore 304 helps to avoid areas of stress concentration.

As known in the art, the external implant surface may be provided with an additive or non-additive surface structure to enhance osseointegration. Said surface structure may be prepared by mechanical abrasive treatment, chemical etching, laser-treatment, additive treatments and combinations thereof, as well known to the person skilled in the art of dental implantology.

The above described embodiments are for illustrative purposes only and the skilled person will realise that alternative arrangements are possible which fall within the scope of the claims. For example, any known anti-rotation element can be used, including an anti-rotation element located on the exterior of the implant. The tapered portion of the threaded section may taper over a radius rather than an angle, or comprise a plurality of taper angles. The bore may be located in the coronal or apical part of an angled implant.

The invention claimed is:

1. A ceramic dental implant for implantation into a jaw bone, the implant extending from an apical end to a coronal end, the implant having a blind bore, which is open towards the coronal end of the implant and extends towards the apical end along a central longitudinal axis, the blind bore comprising a threaded section having a base surface from which a thread protrudes radially inwards, the base surface defining the maximum radius of the thread as measured from the central longitudinal axis, the thread having a coronal flank and an apical flank connected by a crest at their radially inner ends, the crest defining the minimum radius of the thread as measured from the central longitudinal axis, the thread extending in a helical manner along the axial length of the threaded section and having a thread depth defined by the difference in radius between the base surface and the crest, the threaded section comprising a main portion, within which the maximum radius of the thread remains constant along the length of the main portion, and apically adjacent to the main portion, a tapered portion within which the base surface tapers radially inwards in the apical direction from the maximum radius of the thread in the main portion to the minimum radius of the thread at the apical end of the tapered portion, the tapered portion extending over an axial length greater than a thread pitch, so as to form a tapered thread having a gradual reduction in the thread depth, the tapered thread extending over more than one thread turn.

2. The ceramic dental implant as claimed in claim 1, wherein the minimum radius of the thread remains constant over the full length of the threaded section.

3. The ceramic dental implant as claimed in claim 2, wherein the thread remains constant along the length of the main portion in a longitudinal cross section; and within the tapered portion, the crest remains constant while a shape of a transition from the base surface to the coronal and apical flanks changes, such that within the tapered portion the thread is gradually submerged by the tapering base surface.

4. The ceramic dental implant as claimed in claim 1, wherein the tapered thread extends over at least two turns.

5. The ceramic dental implant as claimed in claim 1, wherein within the tapered portion, the base surface tapers radially inwards at a taper angle that is constant over the full length of the tapered portion.

6. The ceramic dental implant as claimed in claim 1, wherein within the tapered portion, the base surface tapers radially inwards at a taper angle that is less than a taper angle of the coronal flank of the thread.

7. The ceramic dental implant as claimed in claim 1, wherein, within the tapered portion, the angle formed between the base surface and both the apical and coronal flanks is obtuse.

8. The ceramic dental implant as claimed in claim 1, wherein, along the length of the main portion of the threaded section, when seen in longitudinal cross-section, a transition between the base surface and the apical and coronal flanks is fully curved, the base surface being tangential to the fully curved transition.

9. The ceramic dental implant as claimed in claim 1, wherein the crest, at least along the length of the main portion, is curved in a longitudinal cross-section, such that there is a fully curved transition between adjacent apical and coronal flanks at their radially inner ends.

10. The ceramic dental implant as claimed in claim 1, wherein the implant is produced by injection moulding.

11. The ceramic dental implant as claimed in claim 1, wherein the implant extends from the apical end to the coronal end along the central longitudinal axis, and the blind bore is open at a coronal end surface of the implant, the coronal end surface being planar and transverse to the central longitudinal axis.

12. The ceramic dental implant as claimed in claim 11, wherein the length of the blind bore, as measured in the longitudinal direction, is more than 70% of the axial length of the implant.

13. The ceramic dental implant as claimed in claim 1, wherein the blind bore further comprises, apical of the threaded section, a non-threaded end section extending from the apical end of the threaded section to the apical end of the bore.

14. The ceramic dental implant as claimed in claim 1, wherein the blind bore comprises an anti-rotation element coronal of the threaded section.

15. A method of manufacturing the ceramic dental implant according to claim 1, the method comprising providing a mould for ceramic injection moulding, the mould comprising a pin extending along a pin central longitudinal axis and having a pin threaded section, the pin threaded section comprising a pin base surface from which a pin thread protrudes radially outwards, the pin base surface defining the minimum radius of the pin thread, as measured from the pin central longitudinal axis, the pin thread having a pin coronal flank and an a pin apical flank connected by a pin crest at their radially outer ends, the pin crest defining the maximum radius of the pin thread, as measured from the pin central longitudinal axis, the pin thread extending in a helical manner along the axial length of the pin threaded section and having a thread depth defined by the difference in radius between the pin base surface and the pin crest, the pin threaded section comprising a pin main portion, within which the maximum radius of the pin thread remains constant along the length of the pin main portion, and apically adjacent to the pin main portion, a pin tapered portion within which the maximum radius of the pin thread decreases in the apical direction from the maximum radius of the pain thread in the pin main portion to the minimum radius of the pin thread at the apical end of the pin tapered portion, the pin tapered portion extending over an axial length greater than a pin thread pitch so as to form a pin tapered thread having a gradual reduction in the thread depth, the pin tapered thread extending over more than one thread turn, and using the mould to create the ceramic dental implant using ceramic injection moulding.

* * * * *